Aug. 31, 1948.  C. M. McDOWELL  2,448,229
PEELING MACHINE INCLUDING ENDLESS TRANSVERSELY
DEFORMABLE ABRADING BELTS
Filed April 19, 1944
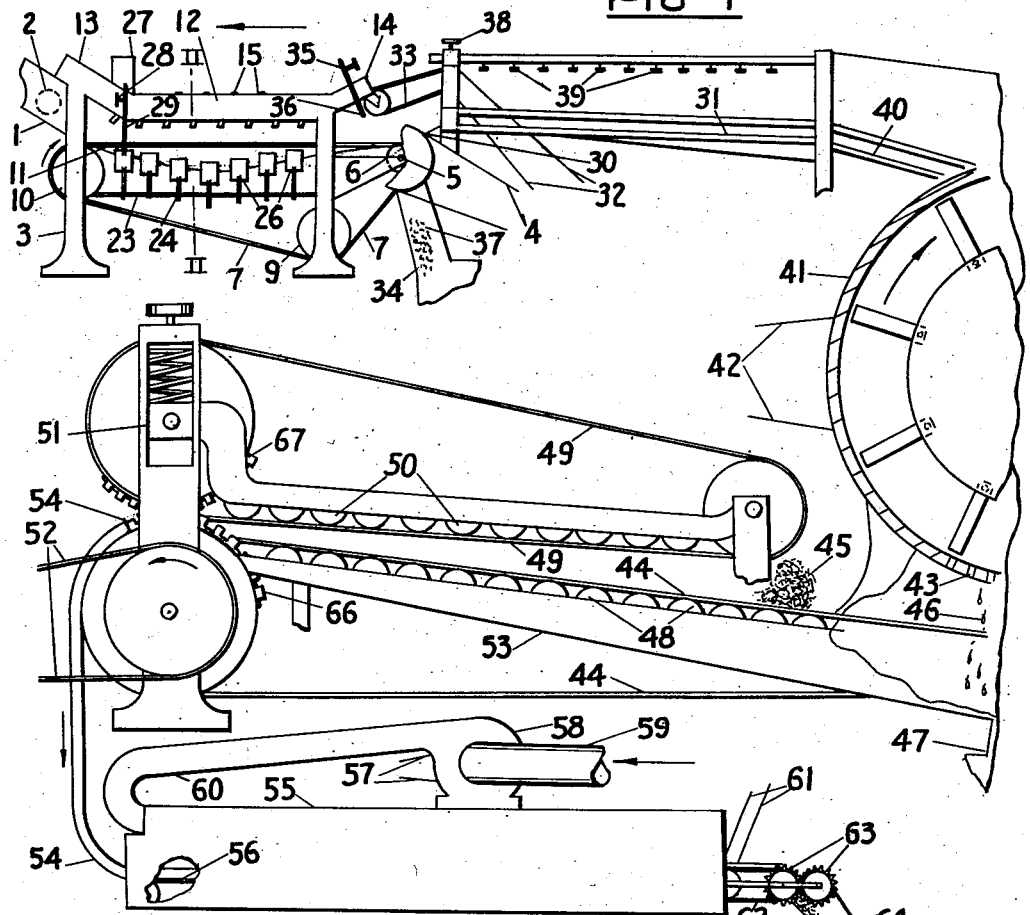
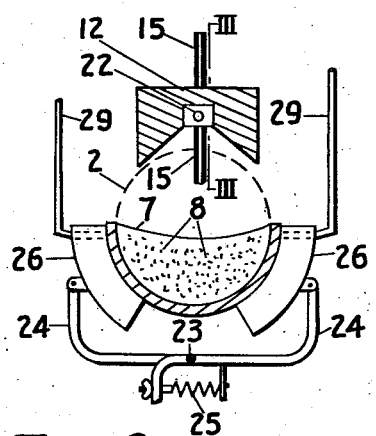
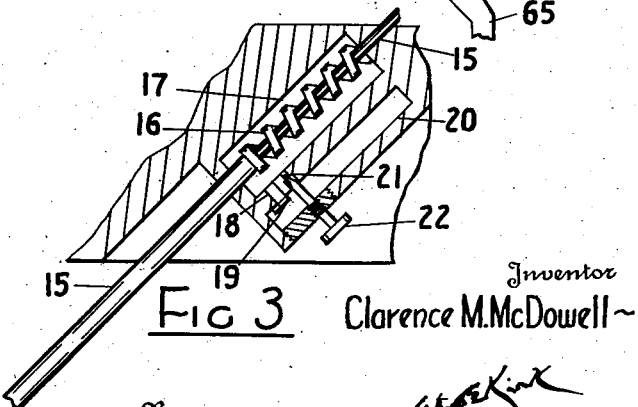
Inventor
Clarence M. McDowell Patented Aug. 31, 1948

2,448,229

UNITED STATES PATENT OFFICE 2,448,229

PEELING MACHINE INCLUDING ENDLESS TRANSVERSELY DEFORMABLE ABRADING BELTS

Clarence M. McDowell, Toledo, Ohio

Application April 19, 1944, Serial No. 531,833

2 Claims. (Cl. 146—49)

1

This invention relates to the treating of citrous fruit to derind or peel the same.

An object of the invention is to remove the rind or peel from fruit by abrading it with an endless abrading member while intermittently retarding the progress of the fruit over said abrading member.

A further object of the invention is the provision of a device having an endless abrading belt which is deformed into a trough for supporting, conveying and removing by abrasion the peel of citrous fruit as it intermittently moves thereover.

Referring to the drawings:

Figure 1 is a side view of the abrading device with other apparatus connected thereto.

Figure 2 is a cross-section of the abrading device of Figure 1 taken on the line II—II.

Figure 3 is a cross-section on the line III—III of Figure 2 showing details of the fruit retarding members.

A chute 1 delivers, in single file order, rollable articles, as oranges or grapefruit 2. The chute 1 extends to a frame 3. A power belt 4 drives a shaft 5, having a pulley 6 about which extends a rubber belt 7 having an abrasive carrying face 8 (Fig. 2). From the drive pulley 6, the belt 7 extends about tightener pulley 9, thence to a pulley 10 adjacent the chute 1. Between the pulleys 10, 6, the belt 4 has its upper horizontal reach as its working section 11.

Above the section 11 is a downwardly open guide way or channel 12, having an intake-directing portion 13, and a release portion 14. Centrally of the underside of the way 12, is a series of forwardly and downwardly directed yieldable plungers or holding pins 15. Compression helical springs 16 normally project the pins 15 to prod or resist rolling action theretoward of the objects or fruit 2. As the plunger 15 retracts into a chamber 17, fluid, as oil, may pass rather freely by a port 18 and past a check or one way valve 19 into a reserve chamber or reservoir 20. As the moving belt 7 with its fruit-engaging abrasive-carrying face 8 pulls or rubs the object 2, there is the delayed or relatively slowed down transit of the object 2, which soon rides clear of the plunger 15, to come into prodding engagement with the succeeding plunger or pin 15. However, the pin 15 as cleared, does not push

2 or ride down the opposite side of the rolling object 2. A port 21 is adjusted by a needle valve 22 so to regulate the fluid return from the chamber 20 into the chamber 17, as to lag the action of the spring 16 sufficiently for the plunger 15 to be in effective prod position for the next article 2 in the trail as carried by the belt 7. Counterflow at the port 21 is minor as to the port 18.

The reach section 11 is a sort of adjustable cradle. Bar 23 from the frame 3, pivotally mounts lever pairs 24, with spring adjustment 25 for directing pressure pads 26 against the under non-abrasive face of the belt 7. While the intensity of the spring action for holding the pads 26 may be set in conformity to the general dimension of the objects 2 being treated, there is in addition, the automatic "give" or yield for responding to a range of over-all dimension. Consistently with the desired mode of operation, the resistance is not such as to wear down or flatten a side of the object as exposed to the abrasive 8, but to function as an effective rubbing such as would be in order for removal of the skin of a potato, an apple, or the rind of an orange, but incidental to non-stop rolling of the object 2. The purpose of the pads 26 is to adapt the reach 11 for properly cradling the objects 2. In order that load on the installation may be minimized, it is desirable that such pads not grab or hold the smooth inner face of the belt 7. Peel oil, or water, or some liquid not to attack the belt 7, may have its flow from reservoir 27 controlled by a valve 28 for flow by hose 29 to one or more of the pads 26. The flexible line or hose 29 responds to the adjusted positions for the pads 26.

The travel rate for the object 2 as clearing the last plunger 15 along the section 11, may be such as to impel the object freely to move up the way 30 for gravity roll therefrom down the way 31. To insure this course, higher speed drive from a belt 32 to a belt 33 may promote this transfer. Simultaneously, should there be some residue clinging to the belt 7, which the belt 7 does not discharge into chute 34, a valve 35, may be opened to have jet or spray 36, say of peel oil, to at least partially clear the belt 7 of fines from the abrader treatment, and such fines 37 be thereby collected by way of the chute 34.

A valve 38 may be adjusted to control sprays or jets 39 along the way 31 for washing, as with water, especially should air blast be not deemed sufficient.

The objects 2 as passing the washing treatment, may roll by a way 40 into a hammer mill 41 driven by a belt 42. The discharge from the hammer mill 41 is thru screen 43 to land on a parallel cable or multiple strand conveyor 44. The fines or pulp body 45 may be moved along by the conveyor 44, while juice or liquid portions 46 may drain thru the conveyor 44 and pass to receiver or tank 47.

Roller or anti-friction support 48 is provided for the reach of the conveyor 44 as merging toward opposing endless cable or belt 49, which has anti-friction means or rollers 50 for its under reach as adapted for squeeze action in transit toward yieldable adjustable bearing 51. Driving belt 52 for the plural strand parallel cable belt 44, is effective to express the liquid or juices therefrom, for such to flow by trough 53 to the tank 47. The converged or squeeze end portion of the opposing reaches of the belts 44, 49, delivers a sheet or strip 54 of the compacted fines or pulp from the sub-divider or mill 41.

The squeezed mass or strip 54, may be treated for still further moisture or vaporizable matter removal, by transit in this continuous process, to a kiln or dryer 55 having a conveyor 56 to promote travel therethru. A belt 57 drives a blower 58 to draw in hot air by a duct 59 and deliver by a duct 60 into the tunnel kiln or dryer 55. A belt 61 for actuating the conveyor 56, has a belt drive 62 therefrom to actuate toothed wheel pair 63, between which the dried and more hard strip 54 in its discharge from the kiln 55, may undergo a desired sub-division or breaking up into fragments 64 to pass by a chute 65 for storage, bagging, or such disposal as may be in order. Depending upon the character of objects or fruit used, this body 64 may be suitable for a fertilizer, for stock food, or even for human consumption.

While the peel or rind remover or abrader is shown as a single file or row device, such may be in multiple to supply the sub-divider or hammer mill 41. Where the time interval factor seems to require a lag, as for the more thorough treatment of each object 2 in the abrader in order to clear its outer surface from all rind or peel, it seems to be more desirable to duplicate the abrasion-effective reaches 11. For capacity of output increase, there may be the desired speed-up for the mill 41 and the juice extractor or squeezer conveyor 44. The temperature of the hot blast, as short of combustion or injury to the product, may be a factor for the drying control range, while another factor may be the length for the tunnel, or the thinness to which the strip 54 is brought in its delivery to the dryer 55.

In applicant's device the fruit, such as oranges, may have its peel removed for direct use or for oil extraction therefrom. The fruit body is immediately so handled that a maximum of the fresh juices are gathered, and the values of the body fiber also saved.

The performance of the equipment hereunder, it is contemplated, to carry on at such speed that there may be some centrifugal force effective at the abrader, especially near the exit portion, to throw off or clear the fines of the rind from the peeled fruit body. The reach 11 and the opposing channel 12 are cooperating directing guides for the spinning or rolling travel of the object in such timed and controlled embracing relation that there may be approached, if not approximately achieved a removal of the rind. Considerable commercial value resides in this automatic treatment, for as a citrus fruit product, the rind oil or peel oil has industrial or food values in itself; while even small portions of such rind extract effect taste disturbance of fruit body juices to a quite detracting extent. Accordingly, in the disclosure herein, importance under the processing treatment is economically brought about in clearing the rind from the fruit to a sufficient extent to enhance the juice and other fruit body values residual therefrom. It is to be noted that this source of improved fruit juices and body, is not conducted at an expense, but as an opening for the additional marketable items of rind body and oil products.

The progressive squeeze is desirably conducted to preclude slippage between the converging cables or belt conveyor means. The steepness of the pitch as to the bulk dumped may be gaged. Furthermore with a gear 66 from the driven conveyor 44, in mesh with a gear 67 to drive the companion or opposing endless belt means 49, the press-effecting multiple cables move in unison to the maximum approach, in this preliminary drying by exuding the juices from the comminuted fruit body fiber.

The continuity in the handling hereunder is such that the sequence of treating maintains a high standard of sanitary condition for the working parts thruout. The speed of transit thru the treating phases is without appreciable pause whereby there may be held in the product the initial fruit freshness, and palatability values.

What is claimed and it is desired to secure by Letters Patent is:

1. An abrading device for derinding citrous fruit, comprising a frame, an endless conveyor belt extending from one end of the frame to the other and having an upper flight and a lower flight, the outer surface of said belt being coated with abrasive material, feed means at one end of the frame to feed fruit to the upper surface of the belt and discharge means at the other end of the frame, means at the ends of the frame to support and move the belt so that its upper flight moves from the feed end to the discharge end of the frame, yieldably mounted arcuate guide means located beneath and in contact with the under surface of the upper flight of the belt between the supporting means to provide for distortion of the abrading surface of the belt into trough shape, a transverse section of which is concaved to conform substantially to the convex surface of the fruit, yieldably mounted retarding members supported by the frame above the upper flight of the belt and extending into urging contact with the fruit on the belt to aid in holding the fruit in abrading relation with the belt surface, but yielding to permit the fruit to be conveyed by said abrading surface from the feed end to the discharge end of the frame.

2. An abrading device for derinding citrous fruit and the like, said device comprising an endless conveyor having upper and lower reaches, a drive for the conveyor, fruit feeding means to the conveyor and fruit discharge receiving means from the conveyor, said means being spaced from each other by the conveyor upper reach extending therebetween, a frame supporting the conveyor means, and embodying concave guide means including elements coacting with the conveyor upper reach to form it into a trough concaved to conform substantially to the convex form of the fruit and therewith providing an abrading path, and a succession of spring pressed retarding members mounted along the path on the frame for yieldably opposing movement of the fruit with the conveyor upper reach to an extent for the travel of the fruit to be delayed relatively to the reach sufficiently for effecting abrading action to be distributed about the traveling fruit.

CLARENCE M. McDOWELL.

REFERENCES CITED

The following references are of record in the file of this patent:

UNITED STATES PATENTS

| Number | Name | Date |
|---|---|---|
| 501,613 | Foote | July 18, 1893 |
| 1,699,995 | Shields | Jan. 22, 1929 |
| 1,801,487 | Cirignani | Apr. 21, 1931 |
| 1,985,323 | McCall | Dec. 25, 1934 |
| 2,102,758 | Spayd | Dec. 21, 1937 |
| 2,134,608 | Hawkins | Oct. 25, 1938 |
| 2,186,907 | Overton et al. | Jan. 9, 1940 |
| 2,206,748 | Moore | July 2, 1940 |
| 2,212,066 | Fry | Aug. 20, 1940 |
| 2,215,944 | Vincent | Sept. 24, 1940 |

FOREIGN PATENTS

| Number | Country | Date |
|---|---|---|
| 421,152 | Great Britain | Dec. 14, 1934 |